C. Polley,
Animal Trap.
No. 94,642.   Patented Sep. 7. 1869.
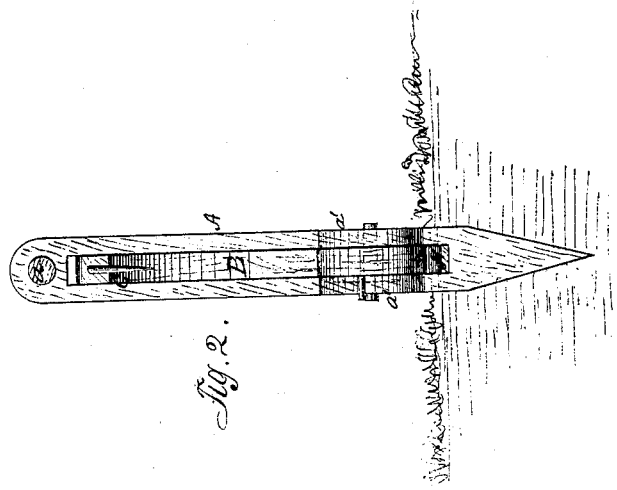
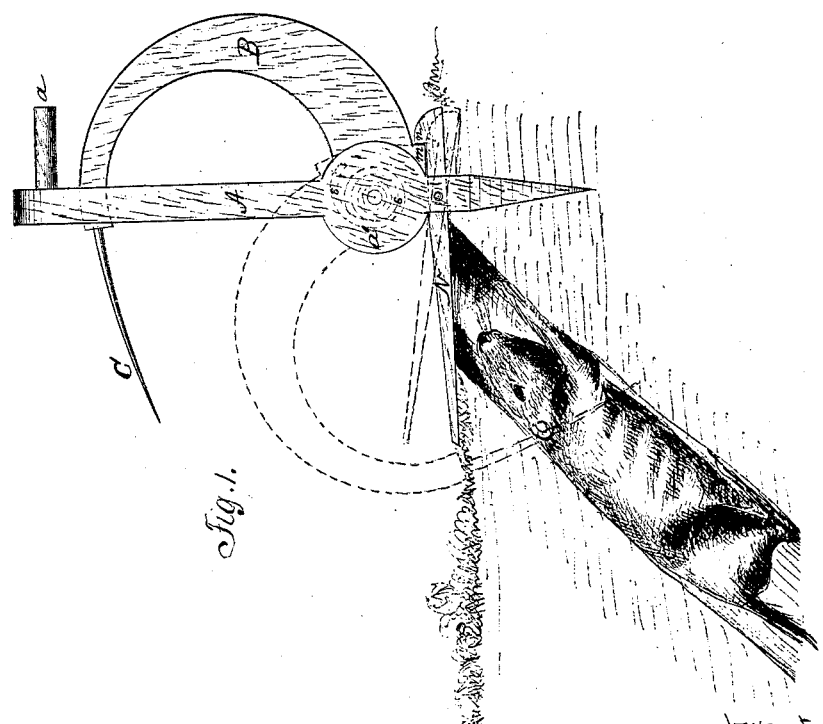
Witnesses:   Inventor:

United States Patent Office.

CLARK POLLEY, OF SHELBYVILLE, TENNESSEE.

Letters Patent No. 94,642, dated September 7, 1869.

IMPROVED ANIMAL-TRAP.

The Schedule referred to in these Letters Patent and making part of the same.

*To all whom it may concern:*

Be it known that I, CLARK POLLEY, of Shelbyville, in the county of Bedford, and State of Tennessee, have invented a new and improved Gopher-Trap; and I do hereby declare that the following is a full, clear, and exact description of the construction and operation of the same, reference being had to the accompanying drawings, making a part of this specification, in which—

Figure 1 is a side view;

Figure 2, an edge view, representing the left side, shown in fig. 1.

The object of this invention is to provide for public use a simple, cheap, convenient, and effective trap, which, being set near the holes of burrowing animals, will destroy them with certainty.

To this end I construct a light and simple trap, consisting of a vertical staff, provided with a short nib or handle; a long sharp spear or spears, attached to a curved and pivoted spur-holder; a spring to strike the spur into the animal; and a catch and trigger to hold the spur back, and let it go when the animal arrives at the proper position to receive the blow.

In the drawings—

A is the staff, sharpened or pointed at its lower end, so that it can be easily driven into the ground, and provided with a short handle, $a$, near its upper end, by which to carry it, thrust it into or remove it from the ground, &c. This staff or standard is slotted from the edge of the ground nearly or quite to the handle, and at the part $a'$ is expanded into a kind of double disk or shield, for the purpose of protecting the spring hereinafter described, as well as of steadying the movement of the curved arm or spur-holder, and of strengthening the standard where it supports the pivot of the curved arm.

B is the curved arm above referred to, articulated to the standard A in the lower end of the slot, and supporting the spur C, as represented in the drawings.

$e$ is a spring coiled around, or partially around the pivot of the arm B, (or around a hub on said arm surrounding the pivot, a chamber or groove being cut in the side of the arm around the hub, but within the periphery of the disk $a'$,) the function of the spring being to throw the arm forward and cause the dart or spur C to transfix the gopher or other animal.

$m$ is a shoulder on the lower end of the arm B, just outside of the disks $a'$ $a'$, and N is a trigger, having a hook, $n$, on one end, which engages with the shoulder $m$, to hold the arm B upraised, as seen in continuous black lines, fig. 1, and when disengaged, allows the spring $e$ to suddenly and with great force bring the arm B down to the position shown by the dotted black lines of the same figure.

The operator takes the instrument by the handle $a$, and sticks the sharp point of the staff into the ground in either a vertical or an inclined position, by the side of the animal's hole, and so that the longer arm of the lever or trigger N will extend nearly horizontally over the hole, as shown in fig. 1. He then raises the spur until the shoulders $m$ $n$ interlock, as represented in the same figure; and the trap is now set. Whenever the animal, coming toward the surface of the ground, pushes up the bar N, as must inevitably be the case, the spur descends with great violence, transfixing him instantly, and insuring his destruction.

Having thus described my invention,

What I claim as new, and desire to secure by Letters Patent, is—

The animal-trap above described, consisting of the standard A, curved arm B, spur C, lever N, shoulders $m$ $n$, and spring $e$, all constructed, arranged, and combined to operate together, substantially as and for the purposes set forth.

CLARK POLLEY

Witnesses:
    J. W. WHITE,
    M. SHAFFNER.